(12) United States Patent
Matsumura (10) Patent No.: US 10,451,415 B2
(45) Date of Patent: Oct. 22, 2019

(54) DEVICE AND METHOD FOR INSPECTING CYLINDRICAL MEMBER

(71) Applicant: The Yokohama Rubber Co., LTD., Minato-ku, Tokyo (JP)

(72) Inventor: Kensuke Matsumura, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 219 days.

(21) Appl. No.: 15/322,060

(22) PCT Filed: Jun. 24, 2015

(86) PCT No.: PCT/JP2015/068137
§ 371 (c)(1),
(2) Date: Dec. 23, 2016

(87) PCT Pub. No.: WO2015/199114
PCT Pub. Date: Dec. 30, 2015

(65) Prior Publication Data
US 2017/0131093 A1    May 11, 2017

(30) Foreign Application Priority Data

Jun. 26, 2014    (JP) .................. 2014-131773

(51) Int. Cl.
*G01B 21/08* (2006.01)
*B29D 29/00* (2006.01)
(Continued)

(52) U.S. Cl.
CPC .............. *G01B 21/08* (2013.01); *B29C 65/00* (2013.01); *B29D 29/00* (2013.01); *B29D 30/00* (2013.01); *B29D 30/0061* (2013.01); *B29D 30/1621* (2013.01); *B29D 30/3007* (2013.01); *B29K 2021/00* (2013.01)

(58) Field of Classification Search
CPC ..................................................... G01B 21/08
See application file for complete search history.

(56) References Cited

U.S. PATENT DOCUMENTS

2009/0260744 A1    10/2009    Bobinger et al.
2009/0272485 A1    11/2009    Hata
(Continued)

FOREIGN PATENT DOCUMENTS

DE    100 36 010    2/2002
EP    2 613 122    7/2013
(Continued)

OTHER PUBLICATIONS

International Search Report for International Application No. PCT/JP2015/068137 dated Sep. 29, 2015, 4 pages, Japan.

*Primary Examiner* — Manuel A Rivera Vargas
(74) *Attorney, Agent, or Firm* — Thorpe North & Western (57) ABSTRACT

Provided are a device and a method for inspecting a cylindrical member. During inspection of a cylindrical member, a degree of widthwise misalignment of a strip-shaped member wound around a molding drum is calculated by a control unit on the basis of detection data from a position sensor and position data of drum-widthwise end faces that are perpendicular to a drum axial center of the molding drum, and the widthwise misalignment of the strip-shaped member is determined to be inside or outside an allowable range on the basis of the calculation result.

12 Claims, 8 Drawing Sheets

(51) Int. Cl.
  *B29D 30/00*   (2006.01)
  *B29C 65/00*   (2006.01)
  *B29D 30/16*   (2006.01)
  *B29D 30/30*   (2006.01)
  *B29K 21/00*   (2006.01)

(56) References Cited

U.S. PATENT DOCUMENTS

| | | |
|---|---|---|
| 2010/0181000 A1 | 7/2010 | Takahashi |
| 2013/0009078 A1* | 1/2013 | Inoue ................ B29D 30/3007 250/559.38 |
| 2013/0169974 A1 | 7/2013 | Iwayama |

FOREIGN PATENT DOCUMENTS

| | | |
|---|---|---|
| JP | H09-183158 | 7/1997 |
| JP | 2001-201335 | 7/2001 |
| JP | 2002-361759 | 12/2002 |
| JP | 2004-257915 | 9/2004 |
| JP | 2007-050537 | 3/2007 |
| JP | 2007-276126 | 10/2007 |
| JP | 2009-226817 | 10/2009 |
| JP | 2009-294182 | 12/2009 |
| JP | 2010-167829 | 8/2010 |
| JP | 2012-111078 | 6/2012 |
| JP | 2013-000959 | 1/2013 |
| KR | 10-2008-0102240 | 11/2008 |
| WO | WO 2007/116860 | 10/2007 |
| WO | WO 2007/118688 | 10/2007 |
| WO | WO 2012/029975 | 3/2012 |

* cited by examiner

DEVICE AND METHOD FOR INSPECTING CYLINDRICAL MEMBER

TECHNICAL FIELD

The present technology relates to a device and a method for inspecting a cylindrical member, and more specifically, to a device and method for inspecting a cylindrical member capable of accurately assessing a widthwise misalignment of a cylindrical member obtained by molding a strip-shaped member into a cylindrical shape.

BACKGROUND ART

In the manufacturing steps of rubber products such as tires, a strip-shaped belt member is used that is made of a plurality of steel cords disposed side by side at a predetermined cord angle and covered with rubber. This belt member is formed by cutting the member obtained by covering the steel cords disposed side by side with rubber, at a predetermined length and at a predetermined angle set in accordance with the cord angle, and bonding together a plurality of the cut members (See Japanese Unexamined Patent Application Publication No. 2009-226817A, for example). This strip-shaped belt member is wound around a molding drum and molded into a cylindrical shape. Further, a tread rubber forming a tire tread is molded into a cylindrical shape by winding strip-shaped unvulcanized rubber around the molding drum.

When the strip-shaped belt members and the strip-shaped unvulcanized rubber are wound around the molding drum in a meandering manner, a cylindrical member having strain in the width direction of the drum is molded. Further, in the cylindrical member molded by winding the plurality of strip-shaped members around the molding drum, also when the strip-shaped members are offset with respect to each other while being misaligned in the width direction by an amount greater than a set value, the strain in the width direction of the drum occurs in the cylindrical member. Manufacturing tires using the cylindrical member subject to this kind of strain makes it difficult to ensure consistent tire quality. Therefore, it is important to accurately assess a widthwise misalignment of the cylindrical member obtained by molding the strip-shaped member in the cylindrical shape.

SUMMARY

The present technology provides a device and a method for inspecting a cylindrical member capable of accurately assessing a widthwise misalignment of a cylindrical member obtained by molding a strip-shaped member into a cylindrical shape.

A method for inspecting a cylindrical member of the present technology is a method for inspecting a cylindrical member that is molded into a cylindrical shape by winding a strip-shaped member around a molding drum and placing a longitudinal distal end and a longitudinal rear end of the strip-shaped member against each other. The method for inspecting the cylindrical member includes the steps of: detecting, by using a position sensor, drum-widthwise end positions of the strip-shaped member wound around the molding drum along an entire length of the strip-shaped member in a longitudinal direction thereof; calculating, by using a control unit, a degree of widthwise misalignment of the strip-shaped member wound around the molding drum on the basis of detection data from the position sensor and position data of drum-widthwise end faces that are perpendicular to a drum axial center of the molding drum; and determining whether the widthwise misalignment of the strip-shaped member is inside or outside an allowable range on the basis of the calculation result.

A device for inspecting a cylindrical member of the present technology is a device for inspecting a cylindrical member that is molded into a cylindrical shape by winding a strip-shaped member around a molding drum and placing a longitudinal distal end and a longitudinal rear end of the strip-shaped member against each other. The device for inspecting the cylindrical member includes: a position sensor configured to detect drum-widthwise end positions of the strip-shaped member wound around the molding drum along an entire length of the strip-shaped member in a longitudinal direction thereof; and a control unit into which detection data from the position sensor is input. Position data of drum-widthwise end faces that are perpendicular to a drum axial center of the molding drum is input into the control unit in advance, the degree of widthwise misalignment of the strip-shaped member wound around the molding drum is calculated by the control unit on the basis of detection data from the position sensor and the position data of the widthwise end faces of the molding drum, and the widthwise misalignment of the strip-shaped member is determined to be inside or outside an allowable range on the basis of the calculation result.

According to the present technology, drum-widthwise end positions of the strip-shaped member wound around the molding drum is detected by the position sensor along the entire length of the strip-shaped member in the longitudinal direction thereof, and the degree of widthwise misalignment of the strip-shaped member wound round the molding drum is calculated by the control unit on the basis of detection data from the position sensor and position data of drum-widthwise end faces that are perpendicular to the drum axial center of the molding drum. Then, the widthwise misalignment of the strip-shaped member is determined to be inside or outside the allowable range on the basis of the calculation result. As a result, the widthwise misalignment of the cylindrical member can be accurately assessed.

Here, upon molding another strip-shaped member into a cylindrical shape by winding the other strip-shaped member around the outer peripheral surface of the cylindrical member so as to be laminated thereon, drum-widthwise end positions of the other strip-shaped member with respect to the drum-widthwise end faces of the molding drum along the entire length of the other strip-shaped member in the longitudinal direction thereof can be detected by the position sensor, and the degree of widthwise misalignment of the other strip-shaped member can be calculated by the control unit on the basis of the detection data from the position sensor, the detection data from the position sensor for the strip-shaped member wound around the molding drum earlier, and the position data of the drum-widthwise end faces of the molding drum. On the basis of the calculation result, the widthwise misalignment of the other strip-shaped member can also be determined to be inside or outside an allowable range. Accordingly, with respect to the cylindrical member formed on the molding drum, the widthwise misalignment of the other strip-shaped member, which is subsequently laminated, can be accurately assessed with respect to the strip-shaped member that was wound around the molding drum earlier. Specifically, the degree of widthwise misalignment of the cylindrical member formed by laminating a plurality of the strip-shaped members on top of each other can be accurately assessed.
}

A position of a longitudinal distal end and a position of a longitudinal rear end of the strip-shaped member molded into the cylindrical shape on the molding drum can be detected by the position sensor, and a matching length, over which the longitudinal distal end and the longitudinal rear end of the strip-shaped member are matched up with each other, can be calculated by the control unit on the basis of the detection data from the position sensor. On the basis of the calculation result, whether a spliced state of the strip-shaped member is appropriate can be determined. Specifically, by comparing the longitudinal distal end (position data of the distal end edge) with the longitudinal rear end (position data of the rear end edge), the longer the length over which the longitudinal distal end and the longitudinal rear end are matched up with each other (disposed in the same position), the more the spliced state is determined to be appropriate.

The thickness of the strip-shaped member, which has been molded into the cylindrical shape on the molding drum, can be detected by a thickness sensor in a peripheral area over which the longitudinal distal end and the longitudinal rear end of the strip-shaped member face each other, and whether the spliced state of the strip-shaped member is appropriate can be determined on the basis of the detection data from the thickness sensor. Specifically, when the longitudinal distal end and the longitudinal rear end overlap with each other, the thickness of the strip-shaped member, i.e., the thickness of the overlapped portion, in the peripheral area is excessive in comparison to the original thickness of the strip-shaped member. On the other hand, when the longitudinal distal end and the longitudinal rear end are separated from each other and are not placed against each other, the thickness of the strip-shaped member in the peripheral area is substantially zero. Thus, the appropriateness of the spliced state of the strip-shaped member can be accurately assessed on the basis of the detection data from the thickness sensor.

BRIEF DESCRIPTION OF DRAWINGS

FIGS. 6A and 6B are expanded explanatory views illustrating, in a cross-sectional view, spliced states of the strip-shaped member wound around the molding drum. FIG. 6A illustrates an area corresponding to P1 in FIG. 5, and FIG. 6B illustrates an area corresponding to P2 in FIG. 5.

DETAILED DESCRIPTION

A device and a method for inspecting a cylindrical member of the present technology will be described below on the basis of an embodiment illustrated in the drawings.

An inspection device 1 for a cylindrical member of the present technology illustrated in FIGS. 1 and 2 (hereinafter referred to as an inspection device 1) inspects a widthwise misalignment of a cylindrical member 9 (9a, 9b) molded by winding a strip-shaped member 8 (8a, 8b) around an outer peripheral surface of a molding drum 5. The strip-shaped member 8 is molded into a cylindrical shape by placing a longitudinal distal end (a distal end edge) and a longitudinal rear end (a rear end edge) thereof against each other.

Examples of the strip-shaped member 8 include a belt member used as a reinforcing member for rubber products such as tires, and various extruded rubber members such as a tread rubber and a side rubber for pneumatic tires. The belt member is a member in which a plurality of steel cords disposed side by side at a predetermined cord angle are covered with rubber.

The inspection device 1 is provided with a position sensor 2 that detects positions of drum-widthwise ends DL of the strip-shaped member 8, which is wound around the outer peripheral surface of the molding drum 5, along the entire length of the strip-shaped member 8 in the longitudinal direction thereof, and a control unit 4 to which detection data of the position sensor 2 is input. In this embodiment, the inspection device 1 is further provided with a thickness sensor 3 that detects the thickness of the strip-shaped member 8, which has been wound around the molding drum 5, in a peripheral area over which a longitudinal distal end E1 and a longitudinal rear end E2 face each other. Detection data from the thickness sensor 3 is also input into the control unit 4.

The molding drum 5 has a cylindrical shape and includes a driving mechanism 7 that drives the molding drum 5 such that the molding drum 5 rotates. Various motors and the like can be used as the driving mechanism 7. A transport conveyor belt 6 is installed extending up to a position below the molding drum 5. The transport conveyor belt 6 is disposed such that the transport direction thereof is perpendicular to a drum axial center DX of the molding drum 5. The strip-shaped member 8 is placed on the transport conveyor belt 6 and transported to the molding drum 5. The control unit 4 controls the movement of the driving mechanism 7 (the rotation speed of the molding drum 5) and the transport speed of the transport conveyor belt 6.

Position data of the drum-widthwise end faces DL, which are perpendicular to the drum axial center DX of the molding drum 5, is input into the control unit 4 in advance. Further, thickness data of the strip-shaped member 8 are also input into the control unit 4 in advance. Furthermore, an indicator (a threshold value) for determining whether the widthwise misalignment of the strip-shaped member 8 is inside or outside an allowable range, and an indicator (a threshold value) for determining whether or not a spliced state of the strip-shaped member 8 is appropriate are input into the control unit 4.

Next, an example of steps of the inspection method for the cylindrical member of the present technology will be described.

Figure 1:
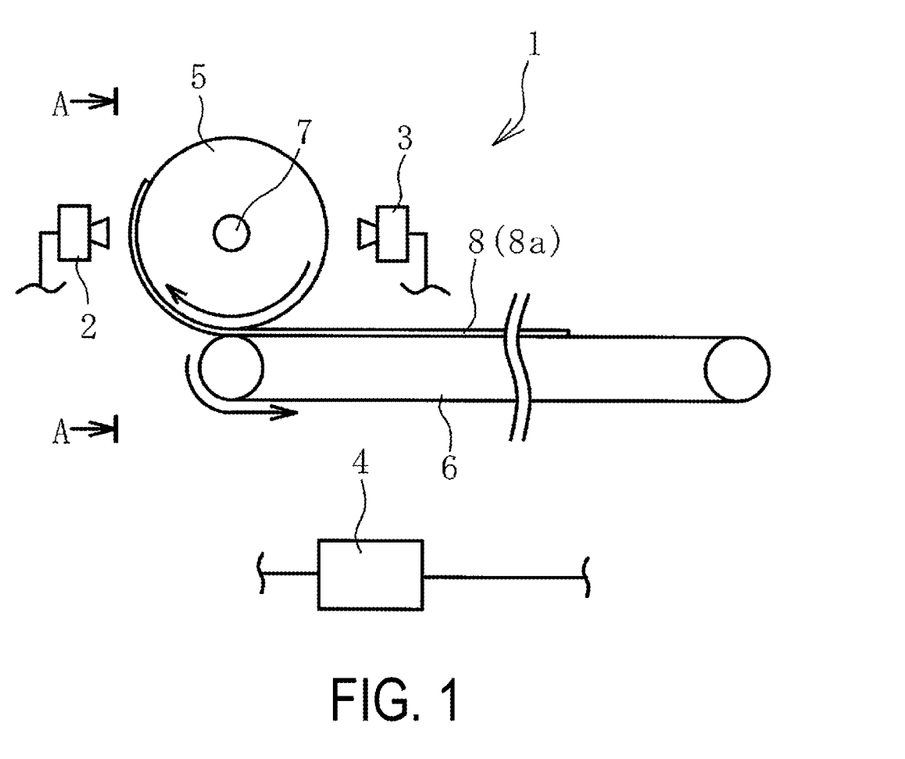
FIG. 1 is an explanatory diagram illustrating, in a side view, an inspection device for a cylindrical member of the present technology.
Figure 2:
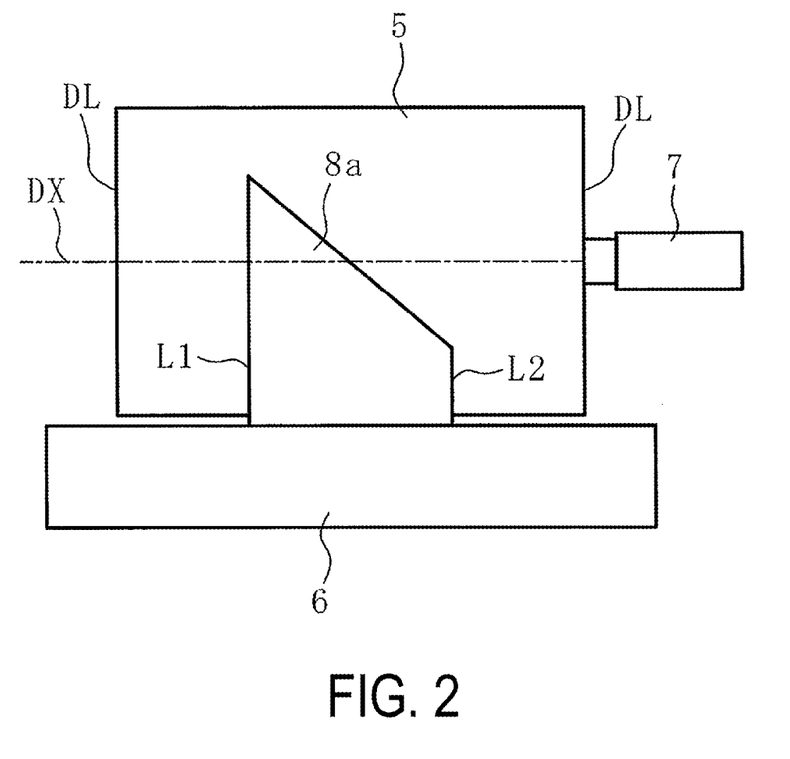
FIG. 2 is a view along arrows A in FIG. 1.
Figure 3:
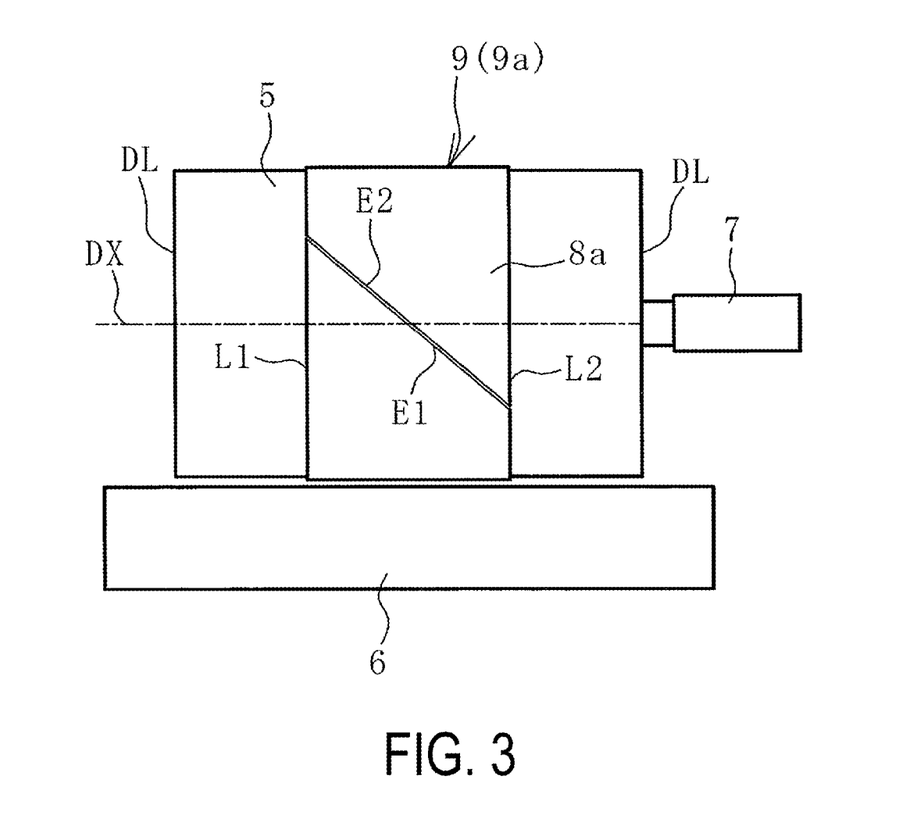
FIG. 3 is an explanatory diagram illustrating, in a front view of a drum, a strip-shaped member molded into a cylindrical shape.

As illustrated in FIGS. 1 and 2, the transport speed of the transport conveyor belt 6, on which the strip-shaped member 8a has been placed, and the circumferential speed of the molding drum 5 at the outer peripheral surface thereof are set to the same speed during operation. As a result, the strip-shaped member 8a is moved and wound around the molding drum 5 such that the strip-shaped member 8a is transferred onto the outer peripheral surface of the molding drum 5. In this way, as illustrated in FIG. 3, the cylindrical member 9a is molded in which the longitudinal distal end E1 and the longitudinal rear end E2 of the strip-shaped member 8a are placed against each other. At this time, while winding the strip-shaped member 8a around the molding drum 5, the position sensor 2 detects drum-widthwise end positions L1 and L2 of the strip-shaped member 8a, which has been wound around the molding drum 5, along the entire length of the strip-shaped member 8a in the longitudinal direction thereof.

Figure 4:
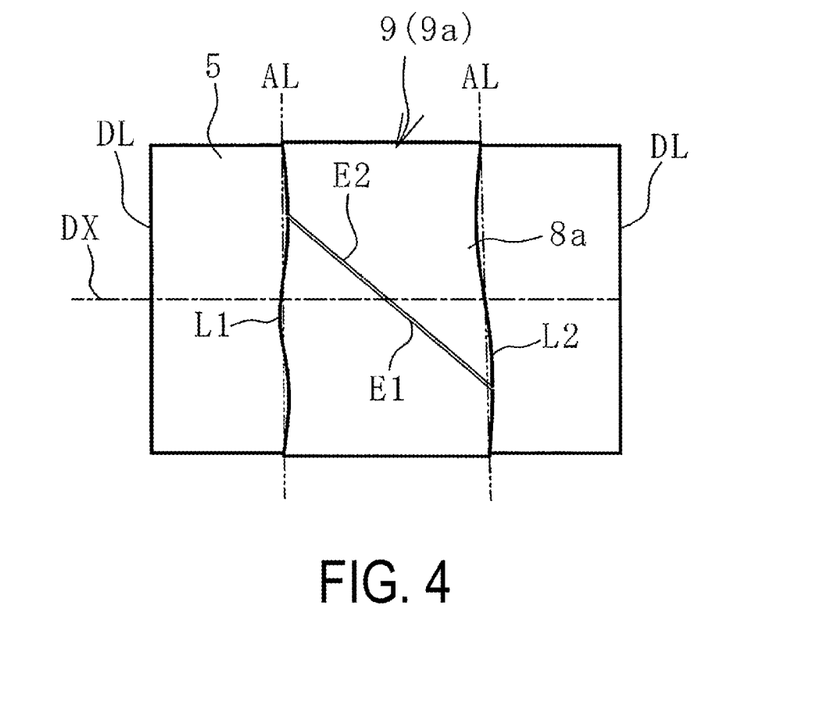
FIG. 4 is an expanded explanatory diagram illustrating, in a front view of the drum, a widthwise misalignment of the strip-shaped member wound around a molding drum.

The control unit 4 calculates a degree of the widthwise misalignment of the strip-shaped member 8a, which has been wound around the molding drum 5, on the basis of the detection data from this position sensor 2 and the position data of the drum-widthwise end faces DL of the molding drum 5 that is input in advance. For example, as illustrated in FIG. 4, average lines AL, which are obtained by averaging out the drum-widthwise end positions L1 and L2 of the strip-shaped member 8a over a whole circumference, are calculated. By comparing position data of the average lines AL with the position data of the drum-widthwise end faces DL, an indicator (at least one indicator out of a maximum value, an average value, a difference between the maximum value and the minimum value, and a standard deviation) relating to a widthwise separation distance between the average lines AL and the drum-widthwise end faces DL is calculated.

The widthwise misalignment of the strip-shaped member 8a is determined to be inside or outside the allowable range on the basis of the calculation result. If the calculation result is inside the allowable range of the widthwise misalignment that is input into the control unit 4 in advance, it is determined that the widthwise misalignment is negligible and that there is no problem. On the other hand, if the calculation result is outside the allowable range of the widthwise misalignment that is input into the control unit 4 in advance, it is determined that the widthwise misalignment is excessive and that there is a problem (a non-standard product that cannot be used in manufacturing).

The drum-widthwise end faces DL are straight lines perpendicular to the drum axial center DX of the molding drum 5. Thus, by calculating the degree of the widthwise misalignment of the strip-shaped member 8a, which has been wound around the molding drum 5, while using the drum-widthwise end faces DL as references, the widthwise misalignment of the cylindrical member 9a can be accurately assessed. Accordingly, pneumatic tires can be manufactured using the cylindrical member 9a whose widthwise misalignment is inside the allowable range. This is advantageous in terms of ensuring consistent tire quality, such as uniformity.

In this embodiment, not only the above-described widthwise misalignment of the strip-shaped member 8a, but also the appropriateness of the spliced state between the longitudinal distal end face E1 and the longitudinal rear end face E2 of the strip-shaped member 8a is inspected. In order to perform this inspection, positions of the longitudinal distal end E1 and the longitudinal rear end E2 of the strip-shaped member 8a, which has been molded into the cylindrical shape on the molding drum 5, are detected by the position sensor 2. The control unit 4 calculates a matching length over which the longitudinal distal end E1 and the longitudinal rear end E2 of the strip-shaped member 8a are matched up with each other, on the basis of the detection data from the position sensor 2.

Specifically, by comparing the longitudinal distal end E1 (the position data of the distal end edge) with the longitudinal rear end E2 (the position data of the rear end edge) on the basis of the calculation result, the longer the length over which the longitudinal distal end E1 and the longitudinal rear end E2 are matched up with each other (disposed in the same position), the more the spliced state is determined to be appropriate. For example, when the strip-shaped member 8a is a belt member, this method is preferably used since the thickness thereof is small.

The appropriateness of the spliced state between the longitudinal distal end face E1 and the longitudinal rear end face E2 of the strip-shaped member 8a can also be inspected by the following method. The thickness sensor 3 detects the thickness (a total thickness) of the strip-shaped member 8a, which has been molded into a cylindrical shape on the molding drum 5, in the peripheral area over which the longitudinal distal end E1 and the longitudinal rear end E2 of the strip-shaped member 8a face each other.

Figure 5:
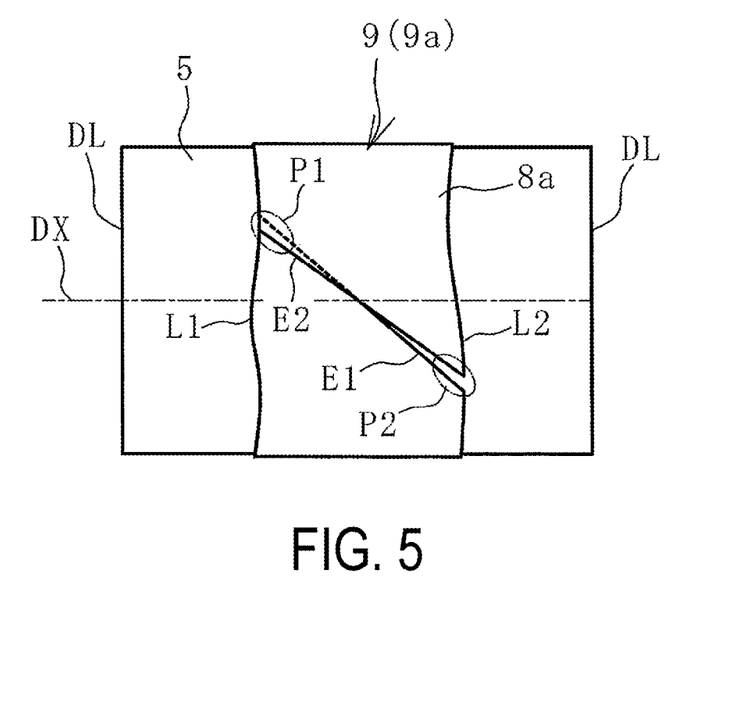
FIG. 5 is an expanded explanatory view illustrating, in a front view, a spliced state of the strip-shaped member wound around the molding drum.
Figure 6A:
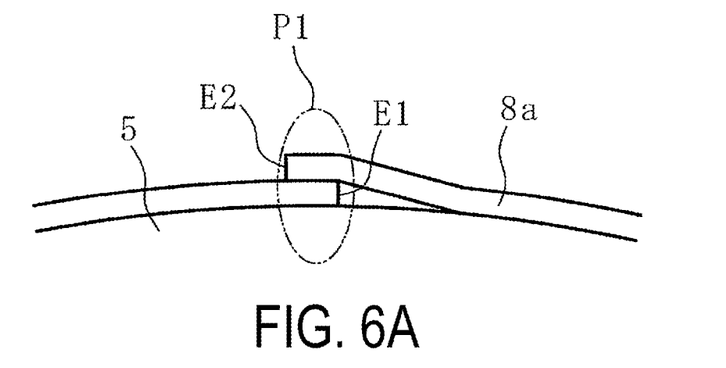
Figure 6B:
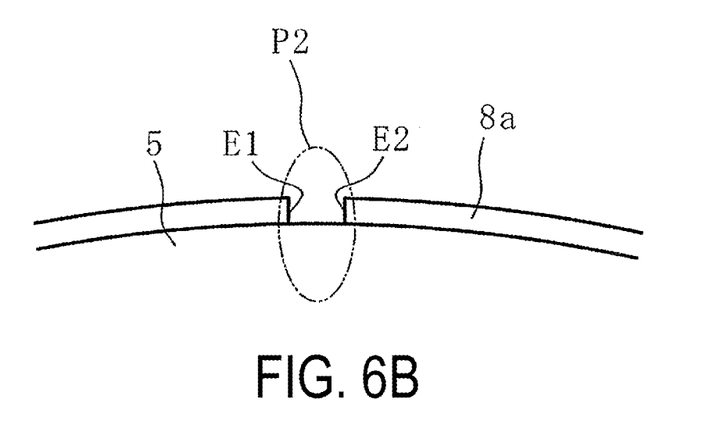

Specifically, as illustrated in FIG. 5, when the longitudinal distal end E1 and the longitudinal rear end E2 of the strip-shaped member 8a overlap with each other in the circumferential direction, the thickness of the strip-shaped member 8a, i.e., the thickness of the overlapped portion, in a peripheral area P1 is excessive compared with the original thickness of the strip-shaped member 8a, as illustrated in FIG. 6A. On the other hand, as illustrated in FIG. 5, when the longitudinal distal end E1 and the longitudinal rear end E2 are separated from each other and are not placed against each other, the thickness of the strip-shaped member 8a in a peripheral area P2 is substantially zero, as illustrated in FIG. 6B. Thus, the appropriateness of the spliced state of the strip-shaped member 8a can be accurately assessed on the basis of the detection data from the thickness sensor 3. For example, when the strip-shaped member 8a is a tread rubber, this method is preferably used since the thickness thereof is large.

Next, when another strip-shaped member 8b is molded into a cylindrical shape by winding the other strip-shaped member 8b around the outer peripheral surface of the molded cylindrical member 9a so as to be laminated thereon, an example of the steps of an inspection for determining whether the widthwise misalignment of the other strip-shaped member 8b is inside or outside the allowable range will be described.

Figure 7:
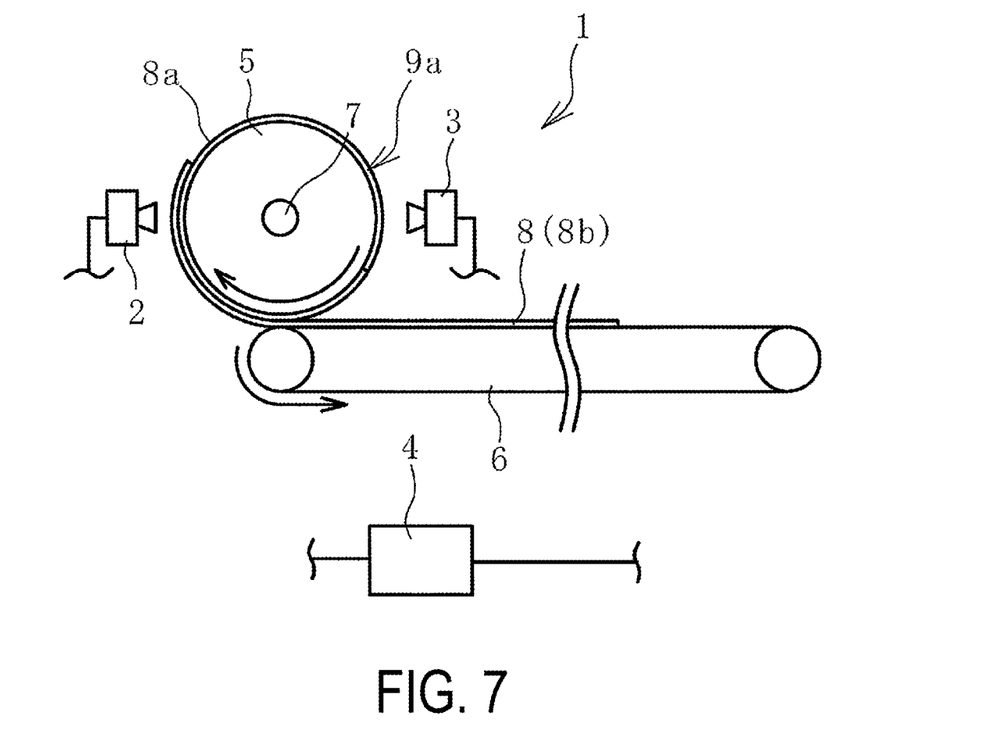
FIG. 7 is an explanatory diagram illustrating, in a side view, a step of winding another strip-shaped member around an outer peripheral surface of the cylindrical member.

As illustrated in FIG. 7, the transport speed of the transport conveyor belt 6 and the circumferential speed of the molding drum 5 at the outer peripheral surface thereof are set to the same speed during operation, and as a result, the strip-shaped member 8b placed on the transport conveyor belt 6 is moved and wound around the cylindrical member 9a such that the strip-shaped member 8b is transferred onto the outer peripheral surface of the cylindrical member 9a. Note that, more preferably, the transport speed of the transport conveyor belt 6 and the circumferential speed of the cylindrical member 9a at the outer peripheral surface thereof are set to the same speed during operation, and as a result, the strip-shaped member 8b moved onto the transport conveyor belt 6 is moved and wound around the cylindrical member 9a such that the strip-shaped member 8b is transferred onto the outer peripheral surface of the cylindrical member 9a. Specifically, the control unit 4 calculates the circumferential speed at the outer peripheral surface of the cylindrical member 9a that is positioned further toward the outer periphery side than the outer peripheral surface of the molding drum 5 by the thickness of the strip-shaped member 8a. Then, the control unit 4 causes the molding drum 5 to rotate at this calculated circumferential speed.

In this way, in a similar manner applied to the above-described strip-shaped member 8a, the cylindrical member 9b is molded in which the longitudinal distal end E1 and the longitudinal rear end E2 of the strip-shaped member 8b are placed against each other. At this time, while winding the strip-shaped member 8b around the molding drum 5, the position sensor 2 detects drum-widthwise end positions L3 and L4 of the strip-shaped member 8b, which has been wound around the molding drum 5, along the entire length of the strip-shaped member 8b in the longitudinal direction thereof.

The control unit 4 calculates the degree of widthwise misalignment of this other strip-shaped member 8b on the basis of the detection data from the position sensor 2, the detection data from the position sensor 2 for the strip-shaped member 8a wound around the molding drum 5 earlier, and the position data of the drum-widthwise end faces DL of the molding drum 5.

Figure 8:
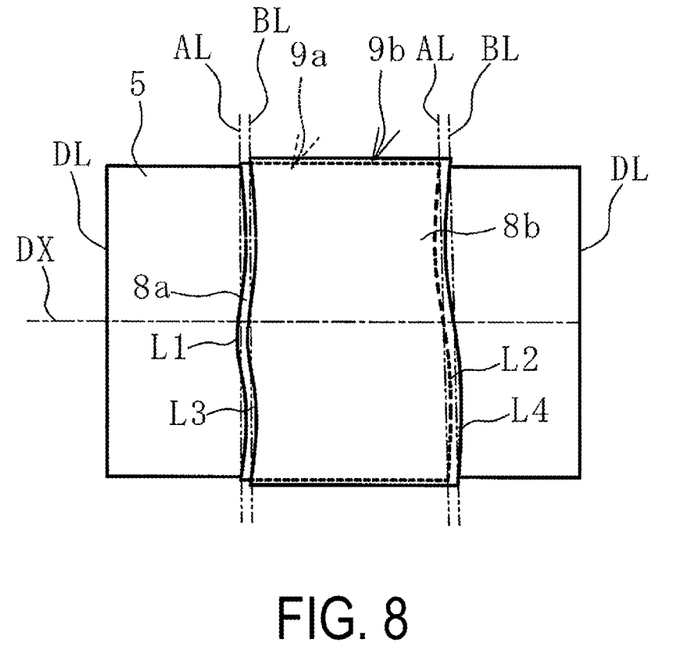
FIG. 8 is an expanded explanatory diagram illustrating a widthwise misalignment between the laminated strip-shaped members.

For example, as illustrated in FIG. 8, average lines BL, which are obtained by averaging out the drum-widthwise end positions L3 and L4 of the strip-shaped member 8b over the whole circumference, are calculated. By comparing position data of the average lines BL with the position data of the drum-widthwise end faces DL, an indicator (at least one indicator out of a maximum value, an average value, a difference between the maximum value and the minimum value, and a standard deviation) relating to a widthwise separation distance between the average lines BL and the drum-widthwise end faces DL is calculated.

The widthwise misalignment (the meandering) of the strip-shaped member 8b is determined to be inside or outside the allowable range on the basis of the calculation result. If the calculation result is inside the allowable range of the widthwise misalignment that is input into the control unit 4 in advance, it is determined that the meandering is negligible and that there is no problem. On the other hand, if the calculation result is outside the allowable range of the widthwise misalignment that is input into the control unit 4 in advance, it is determined that the meandering is excessive and that there is a problem (a non-standard product that cannot be used in manufacturing).

Further, by comparing the calculated position data of the average lines BL with the position data of the average lines AL calculated earlier by averaging out the drum-widthwise end positions L1 and L2 of the strip-shaped member 8a, an indicator (at least one indicator out of a maximum value, an average value, a difference between the maximum value and the minimum value, and a standard deviation) relating to a widthwise separation distance between the average lines BL and the average lines AL is calculated.

The widthwise misalignment (an offset amount) of the strip-shaped member 8b with respect to the strip-shaped member 8a (the cylindrical member 9a) is determined to be inside or outside an allowable range on the basis of the calculation result. If the calculation result is inside the allowable range of the widthwise misalignment (the offset amount) that is input into the control unit 4 in advance, it is determined that the offset amount is negligible and that there is no problem. On the other hand, if the calculation result is outside the allowable range of the widthwise misalignment (the offset amount) that is input into the control unit 4 in advance, it is determined that the offset amount is excessive and that there is a problem (a non-standard product that cannot be used in manufacturing).

In this manner, while using the cylindrical member 9a molded earlier by being wound around the molding drum 5 as a reference, the widthwise misalignment of the strip-shaped member 8b, which is wound around the cylindrical member 9a later so as to be laminated thereon, is detected. As a result, the widthwise misalignment of the cylindrical member, which is a laminated body of the strip-shaped members 8a and 8b, can be accurately assessed. Accordingly, pneumatic tires can be manufactured using the cylindrical member that is the laminated body of the strip-shaped members 8a and 8b whose widthwise misalignment is inside the allowable range. This is advantageous in terms of ensuring the consistent tire quality, such as uniformity.

Also, in the strip-shaped member 8b, similarly to the above-described strip-shaped member 8a, not only the widthwise misalignment of the strip-shaped member 8b, but also the appropriateness of the spliced state between the longitudinal distal end face E1 and the longitudinal rear end face E2 of the strip-shaped member 8b can be inspected.

The present technology can be applied to the manufacturing steps of pneumatic tires, when a belt member is molded into a cylindrical shape, for example. Specifically, first, the cylindrical member 9a is molded by winding a strip-shaped belt member of a first layer (the strip-shaped member 8a) around the molding drum 5, and the widthwise misalignment and the spliced state of the cylindrical member 9a are inspected. Next, a strip-shaped belt member of a second layer (the strip-shaped member 8b) is wound around the outer peripheral surface of the cylindrical member 9a so as to be molded into a cylindrical shape, and the widthwise misalignment and the spliced state of this cylindrical member 9b are inspected. Next, a strip-shaped tread rubber is wound around the outer peripheral surface of the cylindrical member 9b so as to be molded into a cylindrical shape, and the widthwise misalignment and the spliced state of the tread rubber molded into the cylindrical shape are inspected.

The invention claimed is:

1. A method for inspecting a cylindrical member that is molded into a cylindrical shape, comprising:
   winding a strip-shaped member around a molding drum;
   placing a longitudinal distal end and a longitudinal rear end of the strip-shaped member against each other;
   detecting, by using a position sensor, drum-widthwise end positions of the strip-shaped member wound around the molding drum along an entire length of the strip-shaped member in a longitudinal direction thereof;
   rotating the cylindrical member while detecting the drum-widthwise end positions of the strip-shaped member;
   calculating, by using a control unit, a degree of widthwise misalignment of the strip-shaped member wound around the molding drum on the basis of detection data from the position sensor and position data of drum-widthwise end faces that are perpendicular to a drum axial center of the molding drum; and
   determining whether the widthwise misalignment of the strip-shaped member is inside or outside an allowable range on the basis of the calculation result.

2. The method for inspecting a cylindrical member according to claim 1, wherein
   upon molding another strip-shaped member into a cylindrical shape by winding the another strip-shaped member around an outer peripheral surface of the cylindrical member so as to be laminated thereon, drum-widthwise end positions of the another strip-shaped member with respect to the drum-widthwise end faces of the molding drum are detected, by the position sensor, along an entire length of the another strip-shaped member in a longitudinal direction thereof, a degree of widthwise misalignment of the another strip-shaped member is detected, by the control unit, on the basis of detection data from the position sensor, the detection data from the position sensor for the strip-shaped member wound around the molding drum earlier, and the position data of the drum-widthwise end faces of the molding drum, and the widthwise misalignment of the another strip-shaped member is determined to be inside or outside an allowable range on the basis of the calculation result.

3. The method for inspecting a cylindrical member according to claim 2, wherein
a control unit calculates, on the basis of the detection data from the position sensor with respect to the another strip-shaped member, average lines which are obtained by averaging out the drum-widthwise end positions of the another strip-shaped member over a whole circumference; and
the degree of the widthwise misalignment of the another strip-shaped member is calculated on the basis of position data of the average lines and position data of the drum-widthwise end faces of the molding drum;
the control unit calculates the degree of an offset amount of the another strip-shaped member with respect to the strip-shaped member wound around earlier on the basis of position data of the average lines of the another strip-shaped member and position data of the average lines of the strip-shaped member wound around the molding drum earlier; and
the offset amount is determined to be inside or outside the allowable range on the basis of the calculation result.

4. The method for inspecting a cylindrical member according to claim 1, wherein,
a position of the longitudinal distal end and a position of the longitudinal rear end of the strip-shaped member molded into the cylindrical shape on the molding drum are detected by the position sensor, a matching length, over which the longitudinal distal end and the longitudinal rear end of the strip-shaped member are matched up with each other, is calculated, by the control unit, on the basis of detection data from the position sensor, and
whether a spliced state of the strip-shaped member is appropriate is determined on the basis of the calculation result.

5. The method for inspecting a cylindrical member according to claim 1, wherein
a thickness of the strip-shaped member molded into the cylindrical shape on the molding drum is detected, by a thickness sensor, in a peripheral area over which the longitudinal distal end and the longitudinal rear end of the strip-shaped member face each other and whether a spliced state of the strip-shaped member is appropriate is determined on the basis of detection data from the thickness sensor.

6. The method for inspecting a cylindrical member according to claim 1, wherein
the control unit calculates, on the basis of the detection data from the position sensor, average lines which are obtained by averaging out the drum-widthwise end positions of the strip-shaped member over a whole circumference; and
the degree of the widthwise misalignment of the strip-shaped member is calculated on the basis of position data of the average lines and position data of the drum-widthwise end faces which are perpendicular to the drum axial center of the molding drum.

7. A device for inspecting a cylindrical member that is molded into a cylindrical shape by winding a strip-shaped member around a molding drum and placing a longitudinal distal end and a longitudinal rear end of the strip-shaped member against each other, the device comprising:

a position sensor configured to detect drum-widthwise end positions of the strip-shaped member wound around the molding drum along an entire length of the strip-shaped member in a longitudinal direction thereof;
a driving mechanism that drives the molding drum such that the molding drum rotates; and
a control unit into which detection data from the position sensor is input and which controls the driving mechanism to drive the molding drum during detection of the drum-widthwise end positions of the strip-shaped member by the position sensor, wherein
position data of drum-widthwise end faces that are perpendicular to a drum axial center of the molding drum is input into the control unit in advance, a degree of widthwise misalignment of the strip-shaped member wound around the molding drum is calculated by the control unit on the basis of detection data from the position sensor and the position data of the widthwise end faces of the molding drum, and the widthwise misalignment of the strip-shaped member is determined to be inside or outside an allowable range on the basis of the calculation result.

8. The device for inspecting a cylindrical member according to claim 7, wherein
upon molding another strip-shaped member into a cylindrical shape by winding the another strip-shaped member around an outer peripheral surface of the cylindrical member so as to be laminated thereon, drum-widthwise end positions of the another strip-shaped member are detected, by the position sensor, along an entire length of the another strip-shaped member in a longitudinal direction thereof, a degree of widthwise misalignment of the another strip-shaped member is detected by the control unit on the basis of detection data from the position sensor, the detection data from the position sensor for the strip-shaped member wound around the molding drum earlier, and the position data of the drum-widthwise end faces of the molding drum, and
the widthwise misalignment of the another strip-shaped member is determined to be inside or outside an allowable range on the basis of the calculation result.

9. The device for inspecting a cylindrical member according to claim 8, wherein
a control unit calculates, on the basis of the detection data from the position sensor with respect to the another strip-shaped member, average lines which are obtained by averaging out the drum-widthwise end positions of the another strip-shaped member over a whole circumference;
the degree of the widthwise misalignment of the another strip-shaped member is calculated on the basis of position data of the average lines and position data of the drum-widthwise end faces of the molding drum;
the control unit calculates the degree of an offset amount of the another strip-shaped member with respect to the strip-shaped member wound around earlier on the basis of position data of the average lines of the another strip-shaped member and position data of the average lines of the strip-shaped member wound around the molding drum earlier; and
the offset amount is determined to be inside or outside the allowable range on the basis of the calculation result.

10. The device for inspecting a cylindrical member according to claim 7, wherein
a position of a longitudinal distal end and a position of a longitudinal rear end of the strip-shaped member molded into the cylindrical shape on the molding drum are detected by the position sensor, a matching length, over which the longitudinal distal end and the longitudinal rear end of the strip-shaped member are matched up with each other, is calculated by the control unit on the basis of detection data from the position sensor, whether a spliced state of the strip-shaped member is appropriate is determined on the basis of the calculation result.

11. The device for inspecting a cylindrical member according to claim 7, further comprising a thickness sensor configured to detect a thickness of the strip-shaped member molded into the cylindrical shape on the molding drum, in a peripheral area over which the longitudinal distal end and the longitudinal rear end of the strip-shaped member face each other, wherein whether a spliced state of the strip-shaped member is appropriate is determined on the basis of detection data from the thickness sensor.

12. The device for inspecting a cylindrical member according to claim 7, wherein the control unit calculates, on the basis of the detection data from the position sensor, average lines which are obtained by averaging out the drum-widthwise end positions of the strip-shaped member over a whole circumference; and the degree of the widthwise misalignment of the strip-shaped member is calculated on the basis of position data of the average lines and position data of the drum-widthwise end faces which are perpendicular to the drum axial center of the molding drum.

\* \* \* \* \*